United States Patent [19]

McNally et al.

[11] 4,234,210
[45] Nov. 18, 1980

[54] PASSIVE RESTRAINT ACTUATOR MECHANISM SYSTEM

[75] Inventors: Thomas E. McNally, Mt. Clemens; Thomas C. Holka, Farmington Hills; Harold T. Moreau, Canton, all of Mich.

[73] Assignee: Ford Motor Company, Dearborn, Mich.

[21] Appl. No.: 68,842

[22] Filed: Aug. 22, 1979

[51] Int. Cl.³ .............................................. B61R 21/10
[52] U.S. Cl. .................................... 280/804; 297/469
[58] Field of Search ............... 280/804, 803, 802, 808; 297/469

[56] References Cited

U.S. PATENT DOCUMENTS

| | | | |
|---|---|---|---|
| 3,583,726 | 6/1971 | Lindblad | 280/804 |
| 3,860,260 | 1/1975 | Kazaoka et al. | 280/803 |
| 3,882,955 | 5/1975 | Kaneko et al. | 280/803 |
| 3,931,988 | 1/1976 | Oehm | 280/802 |
| 4,061,365 | 12/1977 | Nagano | 280/804 |

FOREIGN PATENT DOCUMENTS 2404771  8/1975 Fed. Rep. of Germany ........... 280/804

Primary Examiner—John A. Pekar
Attorney, Agent, or Firm—John J. Roethel; Keith L. Zerschling

[57] ABSTRACT

A passive seat belt system comprising a two-point belt that in passenger restraining position extends diagonally over the upper torso of the seat occupant from a floor attachment to a retractor mechanism anchored in the vehicle roof. A carriage or trolley movable along a track that in part parallels the vehicle body roof rail and in part the windshield pillar has a belt engageable "D" ring that engages the belt intermediate the ends of the latter. This carriage is movable along the track by a nonelectrical energizer that is energized by door opening movement. Upon movement of the carriage from the retractor end of the track along the roof rail and then downwardly along the windshield pillar, the carriage automatically draws the belt forwardly from its passenger restraining position to provide unobstructed ingress or egress to the compartment through the door opening.

9 Claims, 7 Drawing Figures

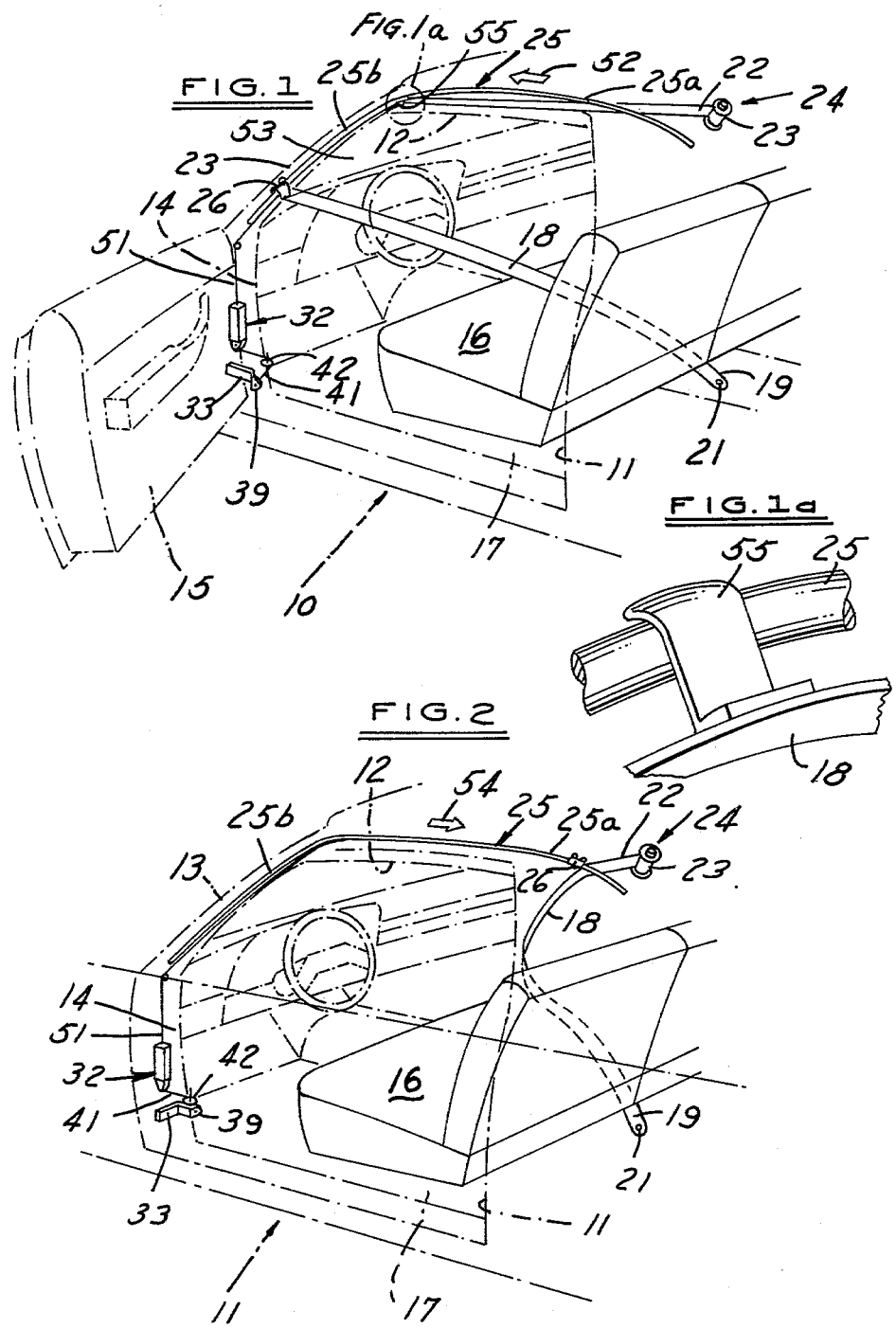

PASSIVE RESTRAINT ACTUATOR MECHANISM SYSTEM

BACKGROUND OF THE INVENTION

It is known in the prior art to provide passive seat belt systems in which a seat belt is constructed and arranged to be anchored at one end to a retractor mechanism on the vehicle floor inboard of a vehicle seat and at its other end to a vehicle door. When the vehicle door is in closed position, the belt extends diagonally from the retractor mechanism over the upper torso of the seat occupant to the door anchor point. When the door is opened, the upper end of the belt is swung outwardly with the door away from the seating position to provide ease of egress or ingress. Reference may be made to U.S. Pat. No. 3,931,988 issued Jan. 31, 1976 to Klaus Oehm et al. for a "Vehicle Safety Device" for a disclosure of such a passive restraint system in its simplest form.

In a more complex form, a belt or belts may be connected to cables actuatable by motor driven pulleys mounted within the door. The pulley systems are operable to automatically position the belt or belts about the seat occupant when the latter sits down and then closes the adjacent vehicle door. Upon the door being opened, the belt is automatically retracted to a position providing for greater ease of egress or ingress. Such a system is exemplified in U.S. Pat. No. 3,882,955 issued May 13, 1975 to Yuichiro Kaneko et al. for a "Safety Belt Device for Vehicles".

There are significant objections to the passive seat belt systems exemplified by the cited patents. In the system disclosed in U.S. Pat. No. 3,931,988, the vehicle door to which the upper end of the belt is anchored must be framed and reinforced to absorb any load placed on the door frame by the belt, as might occur during an accident. As a result, the vehicle body style cannot be a popular hardtop version that was in vogue several years ago since the doors of a hardtop sedan are frameless above the vehicle belt line. Also, the drag of the belt as it is protracted and retracted results in a noticeable increase in door opening effort.

The system disclosed in U.S. Pat. No. 3,882,955 also requires a framed door, and further requires a rather complex door structure below the belt line to accommodate the motors, pulleys, cables and the like used in the power system. The packaging of these items, plus the latch mechanisms, window regulators, window glass and safety beams that must be housed between the inner and outer door panels, present greater difficulty.

It has been suggested that a power operated system for shifting the belt upper anchor point to provide easier egress and ingress from and to the seating position be mounted in the vehicle roof structure, see U.S. Pat. No. 4,061,365 issued Dec. 6, 1977 to Toshio Nagano et al. for a "Saftey System for Protection of Automotive Seat Occupant." The disclosed power system utilizes a reversible electric drive motor and a complex control circuit for controlling the motor to move the belt along a guide rail mounted in proximity to the vehicle roof rail at the vehicle side adjacent the outboard side of the seating position.

According to the present invention, the seat belt is anchored at its upper outboard end in the vehicle roof rail structure and utilizes the motion of the door to energize the belt system to automatically draw the seat belt from the door opening to provide unobstructed entry room. The system, however, uses no electric, or other motors, for its power and, therefore, requires no complex electrical, hydraulic or vacuum circuits to energize the system.

SUMMARY OF THE INVENTION

In accordance with the present invention, there is provided, in combination with a vehicle body having a door opening for ingress/egress to a passenger compartment, a passive belt system for restraining a seat occupant within a vehicle seat. The vehicle body door opening is framed at its upper edge by a roof rail extending longitudinally of the compartment and at its forward edge by a windshield side pillar extending downwardly from the forward end of the roof rail to a vertical hinge pillar to which the door is hinged for swinging movement between opened and closed positions. A passenger seat is mounted on the vehicle floor adjacent the door opening.

The passive seat belt system for restraining a seat occupant within a seat comprises a two-point belt anchored at one end to a vehicle floor fixed attachment at the inboard side of the seat, and at its other end to a retractor mechanism anchored in the vehicle roof rearwardly of the seat. The two-point belt in passenger restraining position extends diagonally over the upper torso of a seat occupant from the floor attachment to the retractor mechanism. Paralleling the roof rail and extending from the forward end of the latter downwardly along the windshield pillar is a track on which a carriage is movable. The carriage has belt engageable means engageable with the belt intermediate the anchored ends of the latter. The carriage is coupled to a nonelectrical energizer that is responsive to the movement of the door when the latter is moved to door opening position. The carriage is movable by the energizer along the track means from the retractor end of the latter to the point at which the track swings downwardly along the windshield pillar. When the door is fully opened, the carriage movement terminates at a terminal position near the hinge pillar end of the track. As it moves from one end of the track to the other, the carriage automatically draws the belt forwardly from its passenger restraining position toward the front end of the compartment to provide unobstructed ingress or egress to the compartment through the door opening.

DESCRIPTION OF THE DRAWINGS

Other advantages and features of the present invention will become more apparent as the description proceeds, reference being had to the accompanying drawings, wherein:

FIG. 1 is a perspective view of a portion of a vehicle body structure illustrating the orientation of the passive seat belt restraint system in door opened condition;

FIG. 1a is an enlarged view taken within the circle 1a of FIG. 1;

FIG. 2 is a view in part similar to FIG. 1 illustrating the orientation of the seat belt system in door closed position;

DETAILED DESCRIPTION OF THE INVENTION

Figure 3:
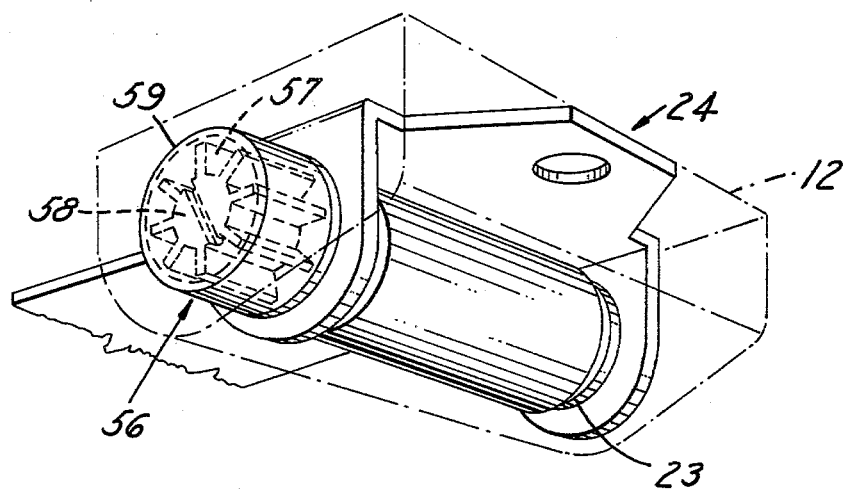
FIG. 3 is an enlarged perspective view of the seat belt retractor mechanism mounted in the roof structure of the vehicle body.

Referring now to the drawings, and more particularly to FIGS. 1 and 2, the seat belt system embodying the present invention is shown as applied to a vehicle body 10 having a door opening 11 permitting ingress or egress to a passenger compartment. The door opening 11 is framed at its upper edge by a conventional roof rail structure 12 that extends longitudinally of the compartment and at its forward end by a windshield side pillar 13. The windshield side pillar 13 extends in a forwardly, downwardly inclined direction from the forward end of the roof rail structure 12 to the upper end of a vertical hinge pillar 14 to which a door 15 is hinged for swinging movement between opened and closed position. The vehicle passenger seat 16 is mounted in a conventional manner on the vehicle compartment floor 17.

The passive seat belt system is shown as a two-point shoulder belt 18. That is, the belt 18 is anchored at its one or lower end 19 to a vehicle floor attachment 21 at the inboard side of the passenger seating position. The other or upper end 22 of the belt 18 is coupled to the reel 23 of a conventional inertia retractor mechanism 24 (see FIG. 4) that is anchored in the vehicle roof structure 12 rearwardly above the passenger seating position. The belt, in passenger restraining position, extends diagonally over the upper torso of a seat occupant from the floor attachment 21 to the retractor mechanism 24.

Figure 4:
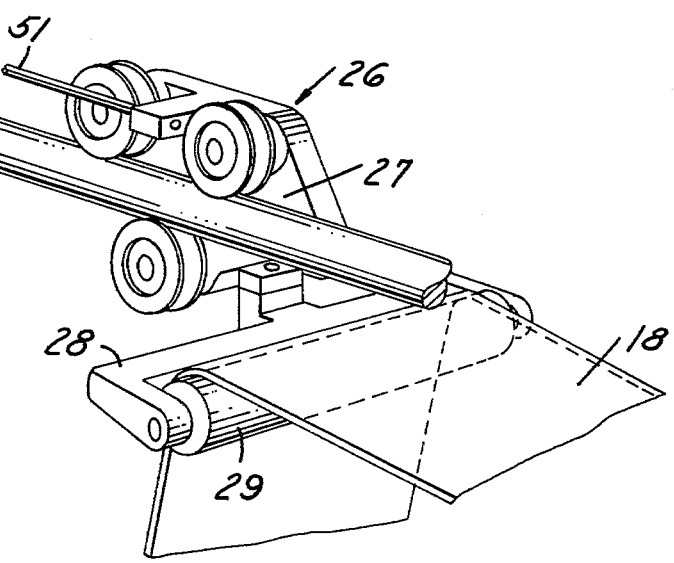
FIG. 4 is an enlarged perspective view of the carriage or trolley that travels on a track that in part parallels the roof rail structure and in part parallels the windshield side pillar of the vehicle body.

A round track 25 is mounted within the vehicle compartment. The track 25 has a first section 25a paralleling the roof rail structure 12 from a position forwardly of the retractor mechanism 24 to the junction of the roof rail and the windshield pillar 13. The track then curves downwardly and has a second section 25b that follows the windshield pillar 13. The track 25 terminates above the junction of the windshield pillar 13 and the hinge pillar 14. Mounted on the track 25 is a tri-roller carriage or trolley 26, as best seen in FIG. 4. Depending from the frame 27 of the carriage 26 is a "D" ring 28 having a roller 29 over which the belt 18 passes, for a reason to be explained. The belt 18 is engaged by the carriage or trolley 26 "D" ring intermediate the carriage and the retractor mechanism. The carriage or trolley 26 with the attached "D" ring 28 is moved or energized along the track 25 by a nonelectrical or mechanical energizer or drive system generally designated 31 (see FIG. 6) coupled to a displacement multiplying multiple-sheave block 32 (see FIG. 5). The energizer or drive system 31 comprises a lever arm 33 that is swingable about the hinge pin 34 of the lower hinge 35 (or upper hinge, if desired) supporting the door 15 on the hinge pillar 14. This lever arm 33 is coupled to the piston rod 36 of a linear compressed fluid actuator 37 mounted on the base 38 of the door hinge 35.

Figure 5:
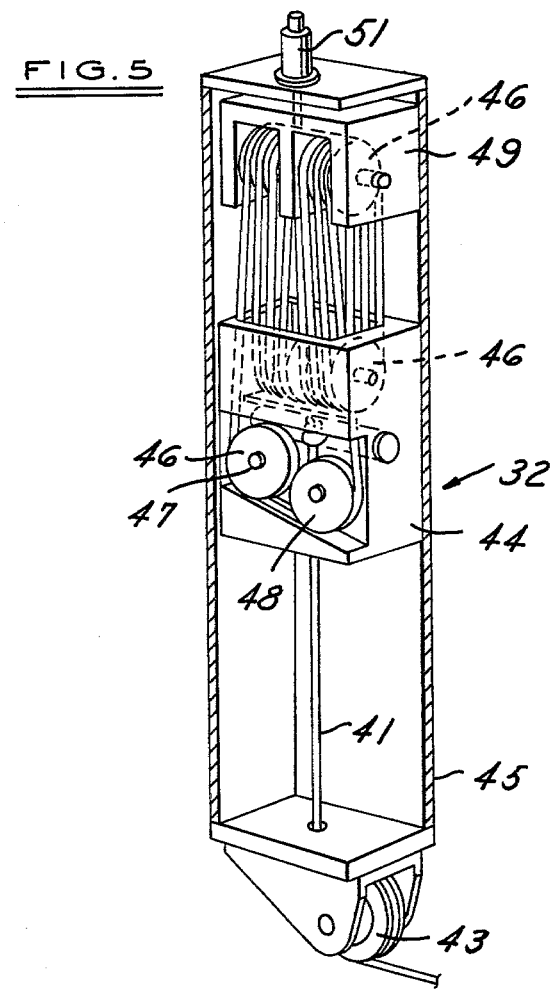
FIG. 5 is an enlarged perspective view of the displacement multiplying multiple-sheave block mounted forwardly of the hinge pillar of the vehicle body.
Figure 6:
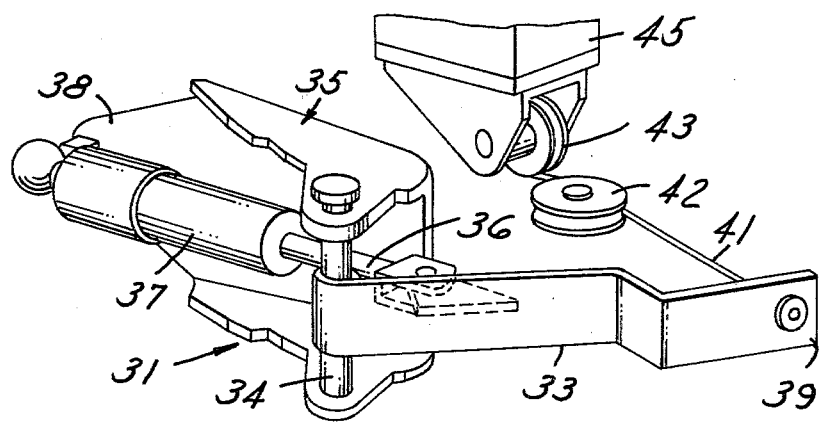
FIG. 6 is an enlarged perspective view of an energizer responsive to motion of the door when the door is moved to opening position to energize the belt system.

Attached to the free end 39 of the lever arm 33 is a flexible cable 41 that passes through an aperture in the door hinge pillar 14 and then around a guide pulley 42 mounted in the hinge pillar and a second pulley 43 mounted at the lower end of the displacement multiplying multi-sheave block 32. As best seen in FIG. 5, the cable 41 is secured to a sliding block 44 contained within the housing 45 of the block 32. The sliding block 44 carries a plurality of pulleys 46. As illustrated, there are six pulleys rotatable about a pivot 47 and two additional pulleys rotatable about separate parallel pivots 48 carried on the sliding block 44. At the upper end of the housing 45 is a fixed block 49 carrying six more pulleys 46. Anchored in the fixed block 49 and woven through all of the pulleys 46 is a second cable 51. This cable 51 is routed through the windshield side pillar 13 to the interior of the vehicle compartment roof and along the side roof rail to the rear of the passenger compartment where it is attached to the tri-roller trolley or carriage 26. With the arrangement shown, one unit of linear movement of the flexible cable 41 results in 14 units of movement of the carriage or trolley 26 along the track 25.

The operation of the passive restraint system, as above described, is as follows: Upon the opening of the compartment door to permit access to the seating position, the lever arm 33 that in door closed position is trapped between the door 15 and the hinge pillar 14 is free to swing in a clockwise direction, as viewed in FIG. 6, about the hinge pin 34. The lever arm 33 is pushed by the linear actuator 37 in the clockwise direction and the force exerted on the lever arm 33 is wholly independent of any force applied to the door.

Movement of the lever arm 33 results in linear movement of the cable 41 and corresponding downward movement of the sliding block 44 of the multiple-sheave block 32 causing the sliding block to move away from the fixed block 49 placing the cable 51 under tension. The cable 51 is pulled in the direction of the arrow 52 in FIG. 1 causing the carriage 26 to be pulled forwardly along the track 25 to a terminal position at the lower end of the windshield pillar 13. As the carriage 26 and its "D" ring 28 move forwardly, the belt 18 comes forward as additional length of belt is taken from the retractor. This pulls the belt forward to the entry (or egress) mode in which the belt assumes a position diagonally over the steering wheel 53.

After entry is made into the compartment and the seating position is occupied, the door will be closed. The lever arm 33 then will swing in a counter-clockwise direction, as viewed in FIG. 6. This results in the fluid in the actuator 37 being compressed and also the tension in the cable 41 being relieved. The belt retractor 24 is then able to pull the belt back, in the direction of the arrow 54 in FIG. 2, to its original preloaded position. This results in the carriage 26 and its "D" ring 28 being pulled rearward from the windshield side pillar to the rear position.

In order to insure maximum entry and egress comfort, a hook is attached to the belt 18 between the retractor 24 and the carriage "D" ring 28. The point of attachment is one that is between the retractor and the "D" ring when the two are in their closest proximity to each other. As the "D" ring pulls the belt forward, the hook 55 engages the track and holds the trailing belt portion above the roof rail structure 12 as the "D" ring travels down the windshield side pillar.

To control the velocity of the protraction and retraction movements of the belt 18, the retractor mechanism is shown having a viscous damper 56 thereon. The viscous damper 56 comprises a vaned member 57 keyed to an external extension 58 of the reel shaft on which the reel 23 is mounted. The vaned member 57 is housed in a housing 59 that is filled with viscous fluid of suitable viscosity. Although the damper 56 is shown as a viscous damper, any suitable damper device may be utilized.

It is to be understood that this invention is not limited to the exact construction illustrated and described above, but that various changes and modifications may be made without departing from the spirit and scope of the invention as defined in the appended claims.

We claim:

1. In combination with a vehicle body having a door opening for ingress/egress to a passenger compartment, the door opening being framed at its upper edge by a roof rail extending longitudinally of the compartment and at its forward edge by a windshield side pillar extending downwardly from the forward end of the roof rail to a vertical hinge pillar to which the door is hinged for swinging movement between opened and closed positions and a floor mounted passenger seat adjacent the door opening, a passive belt system for restraining a seat occupant within the seat, comprising:

a two-point belt anchored at one end to a vehicle floor fixed attachment means at the inboard side of the seat and at its other end to a retractor mechanism anchored in the vehicle roof rearwardly and outwardly of the seat, the belt in passenger restraining position extending diagonally over the upper torso of a seat occupant from the floor attachment to the retractor mechanism, track means paralleling the roof rail and extending from the forward end of the latter downwardly along the windshield pillar, carriage means movable along the track means having belt engageable means engageable with the belt intermediate the anchored ends of the latter, and nonelectrical energizing means responsive to the motion of the door when moved to door opening position to energize the belt system, the energizing means including a lever means swingable in the door opening about a door hinge pivot, a compressed fluid linear actuator mounted on the vehicle body forwardly of the hinge pillar and coupled to the lever means to swing the same outwardly of the door opening, and a displacement multiplying multiple-sheave block mounted on the vehicle body forwardly of the hinge pillar operatively interposed between the lever means and the carriage means whereby short linear movement of the piston rod of the actuator swinging the lever means provides multiplied linear movement of the carriage means along the track means, the carriage means being movable by the energizing means along the track means from the retractor end of the latter to the point at which the track means swings downwardly along the windshield pillar, the carriage means movement terminating at a terminal position near the hinge pillar end of the track means, the carriage means during such movement automatically withdrawing the belt forwardly from its passenger restraining position toward the forward end of the compartment to provide unobstructed ingress or egress to the compartment through the door opening.

2. The combination of claim 1 wherein the door in closed position abuts the lever means and holds the actuator in fluid compressed condition, and upon the door being swung in opening direction out of blocking relation to the lever means, the actuator applies lever swinging force to the lever means independently of the force applied to the door.

3. In combination with a vehicle body having a door opening for ingress/egress to a passenger compartment, the door opening being framed at its upper edge by a roof rail extending longitudinally of the compartment and at its forward edge by a windshield side pillar extending downwardly from the forward end of the roof rail to a vertical hinge pillar to which the door is hinged for swinging movement between opened and closed positions and a floor mounted passenger seat adjacent the door opening, a passive seat belt system for restraining a seat occupant within the seat, comprising:

a two-point belt anchored at one end to a vehicle floor fixed attachment means at the inboard side of the seat and at its other end to a retractor mechanism anchored in the vehicle roof rearwardly and outwardly of the seat, the belt in passenger restraining position extending diagonally over the upper torso of a seat occupant from the floor attachment to the retractor mechanism, track means paralleling the roof rail and extending from the forward end of the latter downwardly along the windshield pillar, carriage means movable along the track means having belt engageable means engageable with the belt intermediate the anchored ends of the latter, and nonelectrical energizing means responsive to the motion of the door when moved to door opening position to energize the belt system, the energizing means including a lever arm swingable in the door opening about a door hinge pivot, a compressed fluid linear actuator coupled to the lever arm, a multiple-sheave block mounted forwardly of the hinge pillar having a sliding block and a fixed block each carrying a plurality of pulleys, a first flexible cable attached at one end to the free end of the lever arm and at its other end to the sliding block, and a second flexible cable fixed to the fixed block and being routed over all of the pulleys and through the windshield side pillar and along the roof rail for attachment to the carriage means, each unit of linear movement of the first cable causing linear movement of the second cable at a ratio of n to 1 where n equals the number of pulleys over which the second cable passes, the carriage means being movable by the energizing means along the track means from the retractor end of the latter to the point at which the track means swings downwardly along the windshield pillar, the carriage means movement terminating at a terminal position near the hinge pillar end of the track means, the carriage means during such movement automatically withdrawing the belt forwardly from its passenger restraining position toward the forward end of the compartment to provide unobstructed ingress or egress to the compartment through the door opening.

4. The combination of claim 3 wherein the door in closed position abuts the lever means and holds the actuator in fluid compressed condition, and upon the door being swung in opening direction out of blocking relation to the lever means, the actuator applies lever swinging force to the lever means independently of the force applied to the door.

5. The combination of claim 3 wherein the belt engageable means on the carriage means comprises a "D" shaped ring means through which the belt passes, and the retractor mechanism comprises a spring-loaded reel mechanism, whereby as the carriage means and the "D" ring means thereon is pulled forwardly, the belt also is pulled forwardly as additional belt length is taken from the retractor mechanism to an entry/egress mode.

6. The combination of claim 5 wherein the belt means has a hook means attached thereto between the retractor mechanism and the "D" ring, the hook being positioned to engage the track means as the "D" ring pulls the belt forwardly to hold the trailing belt above the roof rail as the "D" ring travels down the windshield side pillar.

7. The combination of claim 5 wherein as the door is closed, the fluid of the actuator is compressed and the opening process is reversed by the belt retractor mechanism pulling the belt back to its original preloaded position and pulling the "D" ring and carriage means rearwardly from the windshield side pillar to its door closed position on the track means.

8. The combination of claim 7 wherein the retractor mechanism includes a rotation damper attached to the retractor reel whereby the movement of the belt is carried out a low velocity in either direction of movement.

9. The combination of claim 8 wherein the rotation damper is a rotary viscous means.

* * * * *